(12) United States Patent
Brennecke

(10) Patent No.: US 7,374,219 B2
(45) Date of Patent: May 20, 2008

(54) STRUCTURAL REINFORCEMENT MEMBER AND METHOD OF USE THEREFOR

(75) Inventor: Eric Brennecke, Troy, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 11/229,375

(22) Filed: Sep. 16, 2005

(65) Prior Publication Data

US 2006/0061115 A1  Mar. 23, 2006

Related U.S. Application Data

(60) Provisional application No. 60/612,304, filed on Sep. 22, 2004.

(51) Int. Cl.
*B62D 25/20* (2006.01)
(52) U.S. Cl. ............. 296/30; 296/187.02; 296/193.07; 296/204
(58) Field of Classification Search ........... 296/187.02, 296/193.07–193.09, 203.01–203.04, 204, 296/205, 187.08–187.12, 193.05, 37.14, 296/209, 29, 30; 52/309.1, 309.4–309.7, 52/735.1, 731.6
See application file for complete search history.

(56) References Cited

U.S. PATENT DOCUMENTS

| | | | |
|---|---|---|---|
| 4,463,870 A | 8/1984 | Coburn, Jr. et al. |
| 4,610,836 A | 9/1986 | Wycech |
| 4,751,249 A | 6/1988 | Wycech |
| 4,769,391 A | 9/1988 | Wycech |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,923,902 A | 5/1990 | Wycech |
| 4,978,562 A | 12/1990 | Wycech |
| 5,124,186 A | 6/1992 | Wycech |
| 5,358,397 A | 10/1994 | Ligon et al. |
| 5,506,025 A | 4/1996 | Otto et al. |
| 5,725,272 A | 3/1998 | Jones |
| 5,755,486 A | 5/1998 | Wycech |
| 5,888,600 A | 3/1999 | Wycech |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,068,424 A | 5/2000 | Wycech |
| 6,079,180 A | 6/2000 | Wycech |
| 6,092,864 A | 7/2000 | Wycech et al. |

(Continued)

FOREIGN PATENT DOCUMENTS

DE   198 12 288 C1   2/1998

(Continued)

OTHER PUBLICATIONS

Born et al., Structural Bonding in Automotive Applications.

(Continued)

*Primary Examiner*—D. Glenn Dayoan
*Assistant Examiner*—Greg Blankenship
(74) *Attorney, Agent, or Firm*—Dobrusin & Thennisch PC

(57) ABSTRACT

There is disclosed a reinforcement member with a carrier member and a reinforcement material disposed on the carrier member.

19 Claims, 3 Drawing Sheets

U.S. PATENT DOCUMENTS

| | | | |
|---|---|---|---|
| 6,096,403 A | 8/2000 | Wycech et al. | |
| 6,099,948 A | 8/2000 | Paver, Jr. | |
| 6,103,341 A | 8/2000 | Barz et al. | |
| 6,131,897 A | 10/2000 | Barz et al. | |
| 6,135,542 A | 10/2000 | Emmelmann et al. | |
| 6,149,227 A | 11/2000 | Wycech | |
| 6,150,428 A | 11/2000 | Hanley, IV et al. | |
| 6,165,588 A | 12/2000 | Wycech | |
| 6,168,226 B1 | 1/2001 | Wycech | |
| 6,189,953 B1 | 2/2001 | Wycech | |
| 6,196,621 B1* | 3/2001 | VanAssche et al. | 296/187.09 |
| 6,199,940 B1 | 3/2001 | Hopton et al. | |
| 6,207,244 B1 | 3/2001 | Hesch | |
| 6,233,826 B1 | 5/2001 | Wycech | |
| 6,237,304 B1 | 5/2001 | Wycech | |
| 6,244,601 B1 | 6/2001 | Buchholz et al. | |
| 6,247,287 B1 | 6/2001 | Takabatake | |
| 6,253,524 B1 | 7/2001 | Hopton et al. | |
| 6,263,635 B1 | 7/2001 | Czaplicki | |
| 6,270,600 B1 | 8/2001 | Wycech | |
| 6,272,809 B1 | 8/2001 | Wycech | |
| 6,276,105 B1 | 8/2001 | Wycech | |
| 6,281,260 B1 | 8/2001 | Hanley, IV et al. | |
| 6,287,666 B1 | 9/2001 | Wycech | |
| 6,296,298 B1 | 10/2001 | Barz et al. | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 | 12/2001 | Wycech | |
| 6,341,467 B1 | 1/2002 | Wycech | |
| 6,358,584 B1 | 3/2002 | Czaplicki | |
| 6,368,438 B1 | 4/2002 | Chang et al. | |
| 6,372,334 B1 | 4/2002 | Wycech | |
| D457,120 S | 5/2002 | Broccardo et al. | |
| 6,382,635 B1 | 5/2002 | Fitzgerald | |
| 6,383,610 B1 | 5/2002 | Barz et al. | |
| 6,389,775 B1 | 5/2002 | Steiner et al. | |
| 6,406,078 B1* | 6/2002 | Wycech | 293/120 |
| 6,413,611 B1 | 7/2002 | Roberts et al. | |
| 6,419,305 B1 | 7/2002 | Larsen | |
| 6,422,575 B1 | 7/2002 | Czaplicki et al. | |
| 6,435,601 B2 | 8/2002 | Takahara | |
| H2047 H | 9/2002 | Harrison et al. | |
| 6,443,517 B1* | 9/2002 | Just et al. | 296/107.09 |
| 6,455,146 B1 | 9/2002 | Fitzgerald | |
| 6,467,834 B1 | 10/2002 | Barz et al. | |
| 6,471,285 B1* | 10/2002 | Czaplicki et al. | 296/187.02 |
| 6,474,722 B2 | 11/2002 | Barz | |
| 6,474,723 B2 | 11/2002 | Czaplicki et al. | |
| 6,475,577 B1 | 11/2002 | Hopton et al. | |
| 6,478,367 B2 | 11/2002 | Ishikawa | |
| 6,482,486 B1 | 11/2002 | Czaplicki et al. | |
| 6,482,496 B1 | 11/2002 | Wycech | |
| 6,491,336 B1 | 12/2002 | Beckmann et al. | |
| 6,502,821 B2 | 1/2003 | Schneider | |
| 6,519,854 B2 | 2/2003 | Blank | |
| 6,523,857 B1 | 2/2003 | Hopton et al. | |
| 6,523,884 B2* | 2/2003 | Czaplicki et al. | 296/187.03 |
| 6,546,693 B2 | 4/2003 | Wycech | |
| 6,550,847 B2 | 4/2003 | Honda et al. | |
| 6,561,571 B1* | 5/2003 | Brennecke | 296/187.02 |
| 6,573,309 B1 | 6/2003 | Reitenbach et al. | |
| 6,575,526 B2* | 6/2003 | Czaplicki et al. | 296/187.02 |
| 6,607,238 B2* | 8/2003 | Barz | 296/187.09 |
| 6,619,727 B1 | 9/2003 | Barz et al. | |
| 6,634,698 B2 | 10/2003 | Kleino | |
| 6,641,208 B2 | 11/2003 | Czaplicki et al. | |
| 6,668,457 B1 | 12/2003 | Czaplicki | |
| 6,691,468 B2 | 2/2004 | Helferty | |
| 6,692,347 B1 | 2/2004 | Schneider | |
| 6,708,979 B2 | 3/2004 | Stratman et al. | |
| 6,729,425 B2 | 5/2004 | Schneider | |
| 6,748,667 B2 | 6/2004 | Sevastian | |
| 6,758,507 B2* | 7/2004 | Tarahomi et al. | 293/120 |
| 6,777,049 B2 | 8/2004 | Sheldon et al. | |
| 6,786,533 B2 | 9/2004 | Bock et al. | |
| 6,793,274 B2 | 9/2004 | Riley et al. | |
| 6,811,864 B2 | 11/2004 | Czaplicki et al. | |
| 6,817,654 B2 | 11/2004 | Kitagawa et al. | |
| 6,820,923 B1 | 11/2004 | Bock et al. | |
| 6,846,559 B2 | 1/2005 | Czaplicki et al. | |
| 6,851,232 B1 | 2/2005 | Schwegler | |
| 6,855,652 B2 | 2/2005 | Hable et al. | |
| 6,863,957 B2* | 3/2005 | Wycech | 428/174 |
| 6,865,811 B2* | 3/2005 | Wycech | 29/897.2 |
| 6,880,657 B2 | 4/2005 | Schneider et al. | |
| 6,887,914 B2 | 5/2005 | Czaplicki et al. | |
| 6,890,021 B2 | 5/2005 | Bock et al. | |
| 6,905,745 B2 | 6/2005 | Sheldon et al. | |
| 6,920,693 B2 | 7/2005 | Hankins et al. | |
| 6,921,130 B2 | 7/2005 | Barz et al. | |
| 6,923,499 B2 | 8/2005 | Wieber et al. | |
| 6,928,736 B2 | 8/2005 | Czaplicki et al. | |
| 6,932,421 B2 | 8/2005 | Barz | |
| 6,938,947 B2 | 9/2005 | Barz et al. | |
| 6,941,719 B2 | 9/2005 | Busseuil et al. | |
| 6,953,219 B2 | 10/2005 | Lutz et al. | |
| 6,955,593 B2 | 10/2005 | Lewis et al. | |
| 7,025,409 B2 | 4/2006 | Riley et al. | |
| 7,077,460 B2 | 7/2006 | Czaplicki et al. | |
| 2002/0053179 A1 | 5/2002 | Wycech | |
| 2002/0074827 A1 | 6/2002 | Fitgerald et al. | |
| 2002/0096833 A1 | 7/2002 | Czaplicki et al. | |
| 2002/0174954 A1 | 11/2002 | Busseuil et al. | |
| 2003/0001469 A1 | 1/2003 | Hankins et al. | |
| 2003/0039792 A1 | 2/2003 | Hable et al. | |
| 2003/0050352 A1 | 3/2003 | Guenther et al. | |
| 2003/0057737 A1 | 3/2003 | Bock et al. | |
| 2003/0062739 A1 | 4/2003 | Bock | |
| 2003/0069335 A1 | 4/2003 | Czaplicki et al. | |
| 2003/0140671 A1 | 7/2003 | Lande et al. | |
| 2003/0176128 A1 | 9/2003 | Czaplicki et al. | |
| 2003/0183317 A1 | 10/2003 | Czaplicki et al. | |
| 2003/0184121 A1 | 10/2003 | Czaplicki et al. | |
| 2003/0201572 A1 | 10/2003 | Coon et al. | |
| 2003/0209921 A1 | 11/2003 | Coon et al. | |
| 2003/0218019 A1 | 11/2003 | Le Gall et al. | |
| 2004/0011282 A1 | 1/2004 | Myers et al. | |
| 2004/0018341 A1 | 1/2004 | Richardson et al. | |
| 2004/0018353 A1 | 1/2004 | Czaplicki et al. | |
| 2004/0034982 A1 | 2/2004 | Wieber et al. | |
| 2004/0036317 A1 | 2/2004 | Kleino | |
| 2004/0046423 A1 | 3/2004 | Wieber | |
| 2004/0056472 A1 | 3/2004 | Schneider | |
| 2004/0074150 A1 | 4/2004 | Wycech | |
| 2004/0076831 A1 | 4/2004 | Hable et al. | |
| 2004/0079478 A1 | 4/2004 | Merz | |
| 2004/0084141 A1 | 5/2004 | Czaplicki | |
| 2004/0112531 A1 | 6/2004 | Bogert et al. | |
| 2004/0124553 A1 | 7/2004 | Czaplicki et al. | |
| 2004/0135058 A1 | 7/2004 | Wycech | |
| 2004/0143969 A1 | 7/2004 | Czaplicki | |
| 2004/0212220 A1 | 10/2004 | Riley et al. | |
| 2004/0217626 A1 | 11/2004 | Barz et al. | |
| 2004/0227377 A1 | 11/2004 | Gray | |
| 2004/0256888 A1 | 12/2004 | Le Gall et al. | |
| 2004/0262810 A1 | 12/2004 | Barz et al. | |
| 2004/0262853 A1 | 12/2004 | Larsen et al. | |
| 2005/0012280 A1 | 1/2005 | Richardson | |
| 2005/0016807 A1 | 1/2005 | Braymand | |
| 2005/0017543 A1 | 1/2005 | Riley et al. | |
| 2005/0081383 A1 | 4/2005 | Kosal et al. | |

| | | | | | | |
|---|---|---|---|---|---|---|
| 2005/0082111 A1 | 4/2005 | Weber | | WO | WO 97/43501 | 11/1997 |
| 2005/0087899 A1 | 4/2005 | Coon et al. | | WO | WO 98/50221 | 5/1998 |
| 2005/0102815 A1 | 5/2005 | Larsen | | WO | WO 99/08854 | 2/1999 |
| 2005/0126286 A1 | 6/2005 | Hable et al. | | WO | WO 99/28575 | 6/1999 |
| 2005/0127145 A1 | 6/2005 | Czaplicki et al. | | WO | WO 99/48746 | 9/1999 |
| 2005/0159531 A1 | 7/2005 | Ferng | | WO | WO 99/50057 | 10/1999 |
| 2005/0166532 A1 | 8/2005 | Barz | | WO | WO 00/13958 | 3/2000 |
| 2005/0172486 A1 | 8/2005 | Carlson et al. | | WO | WO 00/37302 | 6/2000 |
| 2005/0194706 A1 | 9/2005 | Kosal et al. | | WO | WO 00/40815 | 7/2000 |
| 2005/0212326 A1 | 9/2005 | Marion | | WO | WO 00/43254 | 7/2000 |
| 2005/0212332 A1 | 9/2005 | Sheldon et al. | | WO | WO 00/46461 | 8/2000 |
| 2005/0217785 A1 | 10/2005 | Hable et al. | | WO | WO 00/55444 | 9/2000 |
| 2005/0218697 A1 | 10/2005 | Barz et al. | | WO | WO 01/54936 | 8/2001 |
| 2005/0230165 A1 | 10/2005 | Thomas et al. | | WO | WO 01/71225 | 9/2001 |
| 2005/0241756 A1 | 11/2005 | Harthcock et al. | | WO | WO 01/83206 | 11/2001 |
| 2005/0251988 A1 | 11/2005 | Mendiboure | | WO | WO 01/88033 | 11/2001 |
| 2005/0260399 A1 | 11/2005 | Finerman | | WO | WO 03/042024 | 5/2003 |
| 2005/0268454 A1 | 12/2005 | White | | WO | WO 03/051676 | 6/2003 |
| 2005/0269840 A1 | 12/2005 | Finerman et al. | | WO | WO 03/093387 A1 | 11/2003 |
| 2005/0276970 A1 | 12/2005 | Busseuil et al. | | WO | WO 2005/077634 A2 | 8/2005 |
| 2005/0285292 A1 | 12/2005 | Mendiboure et al. | | WO | WO 2005/105405 | 11/2005 |
| 2006/0000186 A1 | 1/2006 | Carlson et al. | | WO | WO 2005/113689 | 12/2005 |
| 2006/0006695 A1 | 1/2006 | Lutz et al. | | | | |
| 2006/0008615 A1 | 1/2006 | Muteau et al. | | | | |
| 2006/0019595 A1 | 1/2006 | Lewis et al. | | | | |
| 2006/0020076 A1 | 1/2006 | Finerman et al. | | | | |
| 2006/0021697 A1 | 2/2006 | Riley et al. | | | | |
| 2006/0043772 A1 | 3/2006 | Richardson | | | | |

FOREIGN PATENT DOCUMENTS

| | | |
|---|---|---|
| DE | 198 56 255 C1 | 3/1998 |
| DE | 198 58 903 A1 | 12/1998 |
| EP | 0 611 778 | 1/1994 |
| EP | 0 891 918 A1 | 1/1999 |
| EP | 0 893 331 A1 | 1/1999 |
| EP | 0 893 332 A1 | 1/1999 |
| EP | 1 134 126 B1 | 3/2001 |
| EP | 1 122 156 A2 | 8/2001 |
| EP | 1 031 496 B1 | 12/2001 |
| EP | 0 893 332 B1 | 3/2002 |
| EP | 1 256 512 A2 | 11/2002 |
| EP | 1 362 683 A2 | 11/2003 |
| EP | 1 362 769 A1 | 11/2003 |
| EP | 1 428 744 | 6/2004 |
| EP | 1 475 295 A2 | 11/2004 |
| EP | 1 591 224 A1 | 2/2005 |
| EP | 1 157 916 B1 | 10/2005 |
| FR | 2749263 | 12/1997 |
| GB | 2 375 328 | 11/2002 |
| JP | 10053156 | 2/1998 |
| JP | 2001-62833 | 3/2001 |
| JP | 2001-199362 | 7/2001 |
| JP | 02001191949 A | 7/2001 |
| JP | 2002-362412 | 12/2002 |
| WO | WO 95/32110 | 5/1995 |
| WO | WO 97/02967 | 1/1997 |

OTHER PUBLICATIONS

Hopton et al., Application of a Structural Reinforcing Material to Improve Vehicle NVH Characteristics.
Lilley et al., Comparison of Preformed acoustic Baffles and Two-Component Polyurethane Foams for Filling Body Cavities.
Lilley et al., A Comparison of NVH Treatments for Vehicle Floorplan Applications.
Lilley et al., Vehicle Acoustic Solutions.
Mansour et al., Optimal Bonding Thickness for Vehicle Stiffness.
Copending U.S. Appl. No. 10/718,509, filed Nov. 20, 2003.
Copending U.S. Appl. No. 10/761,635, filed Jan. 21, 2004.
Copending U.S. Appl. No. 10/839,084, filed May 5, 2004.
Copending U.S. Appl. No. 10/806,309, filed Mar. 22, 2004.
Copending Patent Application Serial No. GB 0220945.0 filed Sep. 10, 2002.
Copending Patent Application Serial No. EP 0300159.1 filed Jan. 6, 2003.
Copending U.S. Appl. No. 10/920,520, filed Aug. 18, 2004.
Copending U.S. Appl. No. 10/941,553, filed Sep. 15, 2004.
Copending U.S. Appl. No. 10/973,050, filed Oct. 25, 2004.
Copending U.S. Appl. No. 10/967,783, filed Nov. 20, 2004.
Copending U.S. Appl. No. 60/592,691, filed Jul. 30, 2004.
Copending U.S. Appl. No. 60/623,099, filed Oct. 28, 2004.
Copending U.S. Appl. No. 60/674,919, filed Apr. 26, 2005.
Copending U.S. Appl. No. 60/675,581, filed Apr. 28, 2005.
Copending U.S. Appl. No. 60/676,406, filed Apr. 29, 2005.
Copending U.S. Appl. No. 60/680,268, filed May 12, 2005.
Copending U.S. Appl. No. 60/688,255, filed Jun. 7, 2005.
Copending U.S. Appl. No. 11/188,679, filed Jul. 25, 2005.
Copending U.S. Appl. No. 11/189,190, filed Jul. 26, 2005.
Copending U.S. Appl. No. 60/709,947, filed Aug. 19, 2005.
Copending U.S. Appl. No. 60/711,101, filed Aug. 25, 2005.

* cited by examiner

STRUCTURAL REINFORCEMENT MEMBER AND METHOD OF USE THEREFOR

PRIORITY CLAIM

The present application claims the benefit of U.S. Provisional Application Ser. No. 60/612,304 filed Sep. 22, 2004.

FIELD OF THE INVENTION

The present invention relates generally to a structural reinforcement member and its use in reinforcing a structure of an automotive vehicle such as a convertible.

BACKGROUND OF THE INVENTION

For many years the transportation industry has been concerned with designing structural reinforcement members that do not add significantly to the weight of a vehicle. For example, U.S. Pat. Nos. 5,755,486; 4,901,500; and 4,751,249 describe prior art reinforcing devices. However, it can be particularly difficult to provide adequate or desirable reinforcement to certain vehicles while maintaining lower weights for the reinforcement members. As an example, convertible vehicles often require a relatively high degree of reinforcement since their lack of a rigid roof and pillar structure can result in lower strength and/or integrity relative to vehicles that include a rigid roof and pillar structure. Furthermore, it can be difficult to provide a relatively low weight reinforcement member to a convertible where the reinforcement member can provide adequate or desired amounts of structural integrity to the vehicle. The present invention therefore seeks to provide an improved structural reinforcement member and a method for its use in a reinforced structural system of a transportation vehicle.

SUMMARY OF THE INVENTION

Accordingly, there is disclosed reinforcement member and a structurally reinforced transportation vehicle that includes the reinforcement member. The reinforcement member typically includes a carrier member and reinforcement material disposed upon the carrier member. When installed to a vehicle, the reinforcement material is typically adhered to the carrier member and one or more components of the transportation vehicle. While the reinforcement member may be employed to reinforce a variety of transportation vehicles and may alternatively be employed to reinforce other articles of manufacture, the reinforcement member has been found particularly useful for reinforcement of automotive vehicle and particularly convertibles.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention is predicated upon a structural reinforcement member and its use in forming a structural reinforcement system within an article of manufacture. The structural reinforcement member has been found to be particularly useful for reinforcing portions of automotive vehicles, however, it is contemplated that the member may be employed in a variety of articles of manufacture such as buildings, furniture, watercraft or the like. The structural reinforcement has been found even more particularly useful for reinforcing structures such as underbodies of convertible. As used herein, the term convertible is intended to mean any vehicle without a roof; any vehicle having a roof that is configured for removal or assembly to the vehicle with mechanical fasteners; or any vehicle having a roof that is adjustable from a position overlaying a passenger compartment of a vehicle to a position not overlaying the passenger compartment, unless otherwise specified.

Typically, a structural reinforcement member according to the present invention will include a carrier member with a reinforcement material disposed thereon. It is also contemplated, however, that the carrier member may be utilized without the reinforcement material. The reinforcement member may or may not be located within a cavity defined by a structure of the automotive vehicle. According to one preferred aspect of the invention, the reinforcement member is located adjacent to or within a cavity defined by one or more components that at least partially define an underbody of an automotive vehicle (e.g., a convertible). According to another preferred aspect of the invention, the reinforcement member typically spans at least partially to substantially entirely laterally across the vehicle particularly relative to a fore-aft axis of the vehicle.

Figure 1:
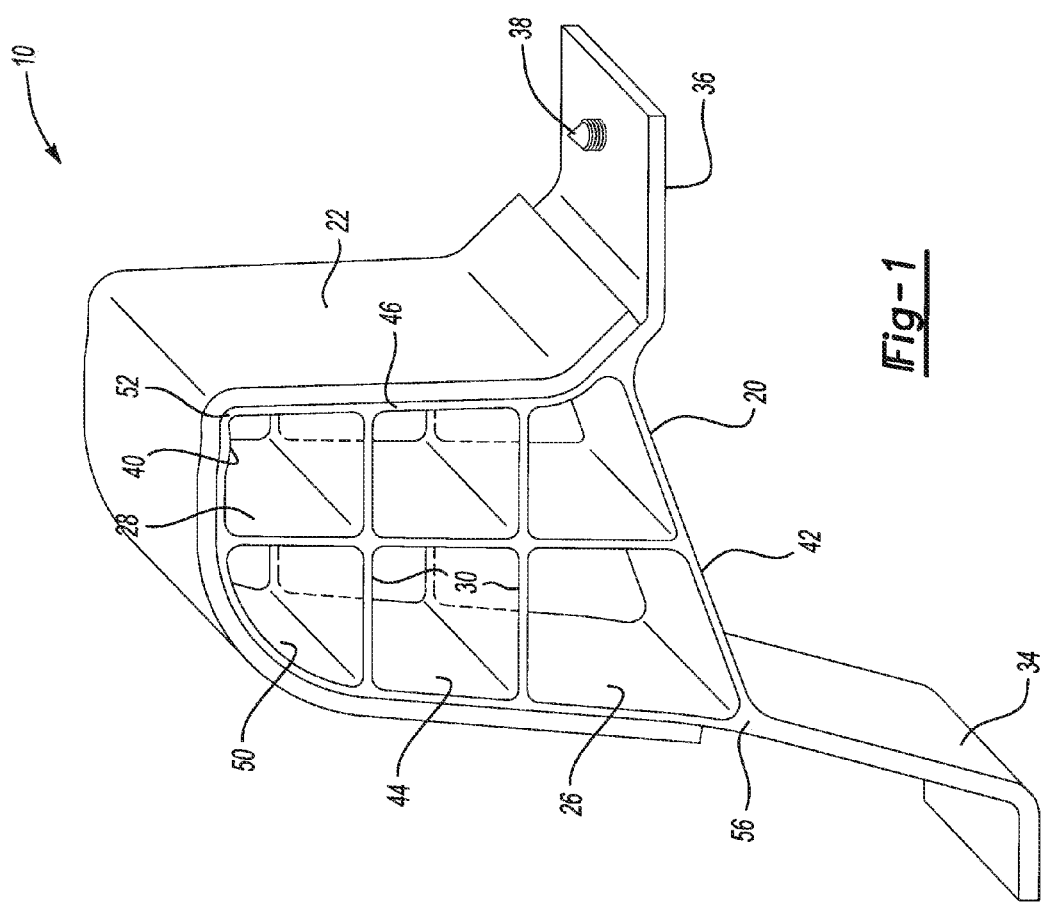
FIG. 1 is a perspective view of a structural reinforcement member according to a preferred aspect of the present invention.
Figure 2:
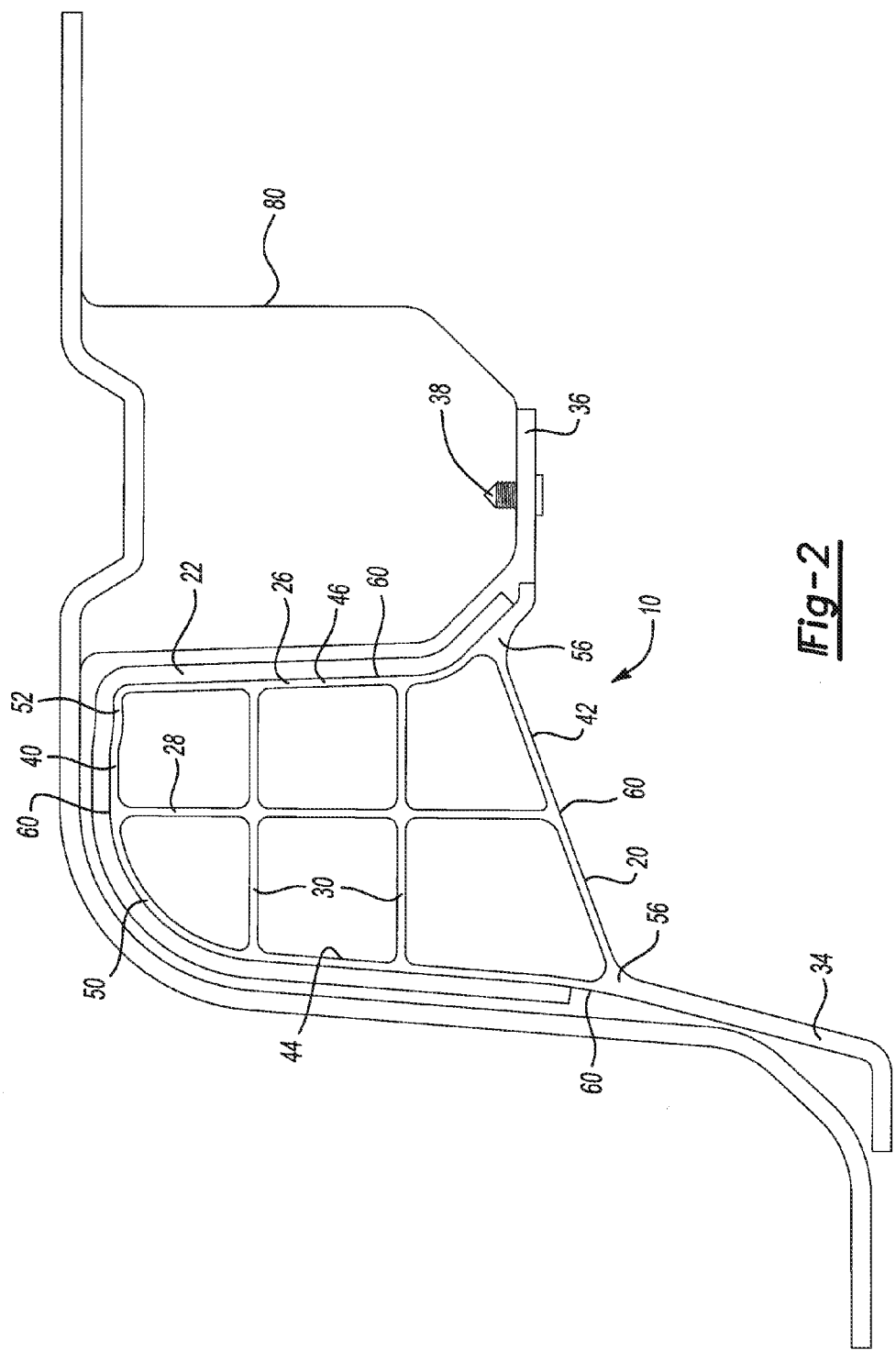
FIG. 2 is front view of the structural reinforcement member of FIG. 1 within a cavity of a structure of an automotive vehicle.

FIGS. 1 and 2 illustrate an example of a structural reinforcement member 10, which is configured for placement within a cavity of an automotive vehicle for forming a reinforced structural system along with one or more components of the vehicle. Preferably, the one or more components of the vehicle at least partially define the cavity. As will be appreciated, the member 10 may be suited for placement in a variety of cavities or in a variety of other locations for reinforcing a variety of components of the automotive vehicle.

The reinforcement member 10 includes a carrier member 20 and one or more masses 22 of reinforcement material disposed upon the carrier member 20. The illustrated carrier member 20 is comprised of an outer peripheral strip 26 and a plurality of ribs 28, 30. The carrier member 20 also includes a first flange 34 and a second flange 36.

In the particular embodiment illustrated, the outer strip 26 includes a first wall, a second wall, a third wall and a fourth wall respectively illustrated as an upper wall 40, a lower wall 42, a first side wall 44 and a second side wall 46. As can be seen, the upper wall 40 is connected to the first side wall 44 by an arcuate portion 50 and the upper wall 40 is connected to the second side wall 46 at a corner 52. Additionally, the lower wall 42 is connected to both of the side walls 44, 46 at respective corners 56.

The illustrated ribs 28, 30 of the carrier member 20 include a pair of transversely extending ribs 30, which both intersect a vertically extending rib 28. As shown, the transverse ribs 30 are substantially perpendicular to the vertical rib 28. In alternative embodiments, however, it is contemplated that there may be multiple ribs or a singular rib extending in a wide variety of directions (e.g., vertically, horizontally, transversely, combinations thereof or the like) and they may be intersecting or non-intersecting and may be skew, perpendicular or parallel. Moreover, the rib or ribs may be straight, curved, contoured or otherwise shaped if such a configuration is desired.

The flanges 34, 36 of the carrier member 20 respectively extend outwardly from adjacent the intersecting corner 56 or interface of the first side wall 44 and the lower wall 42 and from adjacent the intersecting corner 56 or interface of the second side wall 46 and the lower wall 42. Generally, however, the flanges of the carrier member, when included, may extend from other locations of the carrier member if needed or desired.

While the particularities of the carrier member 20 of FIGS. 1 and 2 have been discussed in detail, it is contemplated that the carrier member of the present invention may be provided in different configurations. For example, the carrier member may have a partially or substantially entire tubular outer periphery, optionally with internal intersecting ribs. As another example, the outer periphery of the carrier member may be partially defined by smooth surfaces, contoured (e.g., ribbed) portions or the like.

Typically, the reinforcement material of the present invention is disposed upon outer and/or outwardly facing surfaces of the carrier member. However, it is also contemplated that the reinforcement material may be located internally within cavities or other internal portions of the carrier member. Moreover, there may be one or may be multiple masses of the expandable material disposed within or upon the carrier member.

In the embodiment illustrated, a single continuous mass 22 of the reinforcement material is disposed upon and adhered to outwardly facing surfaces 60 of the first side wall 44, the second side wall 46 and the upper wall 40. It is contemplated, however, that the mass 22 may be divided into multiples masses and may be disposed upon and/or adhered to any combination of the walls 40, 42, 44, 46, the ribs 28, 30 and the flanges 34, 36.

The carrier member or at least portions thereof could be formed of polymeric material materials (e.g., injection molded nylon, injection molded plastic, extruded polymeric materials, combinations thereof or the like), or molded, extruded or otherwise-shaped metal (such as aluminum, magnesium, steel and titanium, an alloy derived from the metals, and even a metallic foam). The carrier member may also be formed of a molding compound such as a sheet molding compound (SMC), a bulk molding compound (BMC), a thick molding compound (TMC) or the like. The formation of carrier members from molding compound is discussed in U.S. patent application Ser. No. 10/712,069, filed Nov. 13, 2003, which is incorporated herein by reference for all purposes.

The reinforcement material may be formed of several different materials. Generally speaking, the present invention may utilize technology and processes for forming and applying the reinforcement material such as those disclosed in U.S. Pat. Nos. 4,922,596, 4,978,562, 5,124,186, and 5,884,960 and commonly owned, co-pending U.S. application Ser. Nos. 09/502,686 filed Feb. 11, 2000 and Ser. No. 09/524,961 filed Mar. 14, 2000, all of which are expressly incorporated by reference for all purposes. Preferably, the reinforcement material is formed of a high compressive strength and stiffness heat activated reinforcement material having foamable characteristics. The material may be generally dry to the touch or tacky and can be placed upon a carrier member or the like in any form of desired pattern, placement, or thickness, but is preferably of substantially uniform thickness. One exemplary reinforcement material is L-5218 structural foam available through L&L Products, Inc. of Romeo, Mich.

Though other heat-activated materials are possible for the reinforcement material, a preferred heat activated material is an expandable polymer or plastic, and preferably one that is foamable with adhesive characteristics. A particularly preferred material is an epoxy-based structural foam. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing or sealing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow (e.g, become thermoset).

An example of a preferred structural foam formulation is an epoxy-based material that is commercially available from L&L Products of Romeo, Mich., under the designations L5206, L5207, L5208, L-5248, L5218. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier member through fastening means which are well known in the art.

While the preferred materials for fabricating the reinforcement material have been disclosed, the reinforcement material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the reinforcement material 30 include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L5207, L-5248 and L5208, which are commercially available from L & L Products, Romeo, Mich.

In applications where the reinforcement material is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during paint or e-coat curing or baking steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to 300 to over 1000 percent relative to their original non-expanded sizes. The level of expansion of the reinforcement material may be increased to as high as 1500 percent or more. Typically, strength and stiffness are obtained from products that possess lower expansion characteristics.

Some other possible materials for the reinforcement material include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good adhesion durability properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the reinforcement material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure, door beam, carrier member or the like, and applying it to thereto.

It is contemplated that the material of the reinforcement material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or reinforcement material can be snap-fit onto the chosen surface or substrate; placed into beads or pellets for placement along the chosen substrate or member by means of extrusion or injection molding; placed along the substrate through the use of baffle technology; a die-cast application according to teachings that are well known in the art; pumpable application systems which could include the use of a baffle and bladder system; and sprayable applications.

In still another embodiment, it is contemplated that the reinforcement material may be applied to the carrier member while the carrier member is at an elevated temperature. As such the reinforcement material will adhere to the carrier member as described in U.S. Provisional Patent Application Ser. No. 60/443,108, already incorporated by reference.

Generally, the reinforcement member is applied to a structure of a transportation vehicle and particularly to an automotive vehicle for forming a reinforced structural system. During formation of the reinforced structural system, the reinforcing structural member can be placed within a cavity of or adjacent to a structure of an automotive vehicle and the structure may be defined by one or more components of the automotive vehicle.

Typically, the reinforcement member is placed adjacent to an underbody of an automotive vehicle and even more typically within a cavity or adjacent one or more components that comprise the underbody of a convertible. The reinforcement member may be designed to span laterally at least partially or substantially entirely across the underbody of the vehicle. The reinforcement member may also be designed to span at least partially or substantially entirely longitudinally along the underbody of the vehicle.

Figure 3:
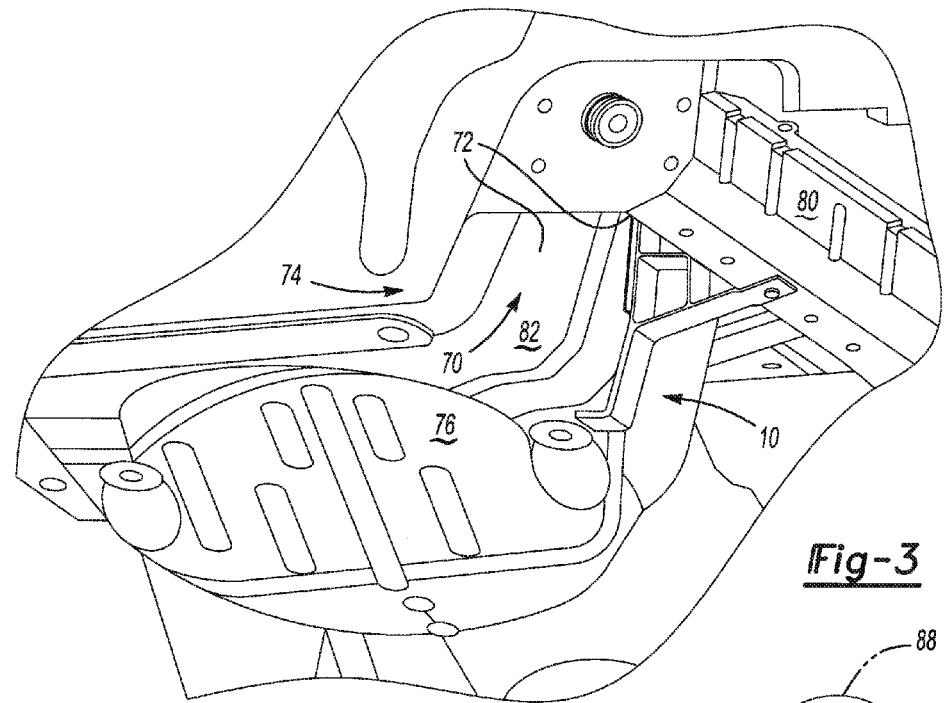
FIG. 3 is a perspective view of the underbody of a vehicle with the structural reinforcement applied thereto.

In the exemplary embodiment shown in FIG. 3, the member 10 is placed within a cavity 70 defined by walls 72 of a structure 74 formed by one or more components of the underbody 76 of a convertible. In the particular embodiment illustrated, the components include a frame rail 80 and a trunk compartment 82 (e.g., a spare wheel compartment) of the automotive vehicle. It is contemplated, however, that the reinforcement member 10 may be placed adjacent to or within a cavity of various components of a vehicle underbody such as underbody shields or guards or other.

It should be noted that various fasteners or adhesive may be used to at least temporarily hold the reinforcement member in place until the reinforcement material is activated. For example, one or both of the flanges 34, 36 or other portions of the carrier member 20 may include one or more mechanical fasteners 38 or adhesives for holding the reinforcement member 10 in place.

Figure 4:
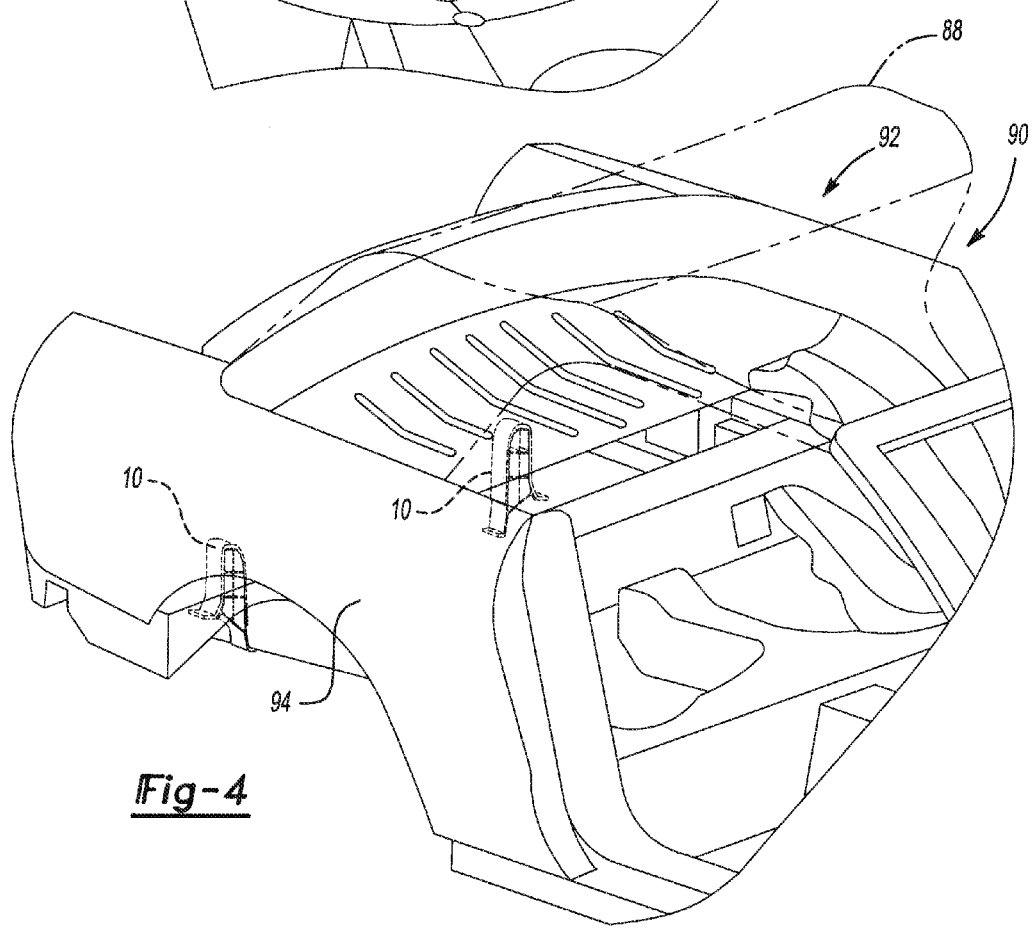
FIG. 4 is a perspective view of a convertible vehicle with the structural reinforcement applied thereto.

As shown in FIG. 4, the reinforcement member 10 may be configured for placement with two locations adjacent the underbody 76 of the vehicle 90 (e.g., convertible with a roof 88 as defined herein). In the embodiment shown, each of the members 10 is located within cavities of the vehicle as described above, however, one of the members 10 is located adjacent a first side 92 of the vehicle 90 while the other member 10 is located adjacent a second side 94 of the vehicle 90 that is opposite the first side 92.

After desired placement of the reinforcement member, the reinforcement material is activated (e.g., expanded using heat experienced during an e-coat process or other painting operation typically encountered in the production of automotive vehicles), such that the reinforcement material, expands, contacts and adheres to the walls or surfaces of the components adjacent the materials.

In the particular embodiment illustrated, the reinforcement member 10 is typically located adjacent the underbody 76 within the cavity 70 after the e-coat process, but prior to vehicle painting (e.g., in the paint shop) such that the reinforcement material activates in the paint drying oven.

Once the reinforcement material is substantially fully expanded and cured, the reinforcement member reinforces the components and/or other members (e.g., frame members, trunk compartment rails, body members or panels, pillars or the like) of the vehicle thereby forming a reinforced system. Advantageously, when used for a convertible, the reinforcement member can provide strength and integrity that might have otherwise been provided by a rigid roof and pillar assembly of a non-convertible vehicle. In particular, the reinforcement member or members can provide the overall vehicle and particularly convertibles with greater overall torsional rigidity and can reduce noise, vibration and harshness (NVH) for the vehicles. The reinforcement member(s) may also assist in adjusting (e.g., raising) the natural frequency of the body of the vehicle thereby limiting or adjusting the amount of vibration transmitted by the vehicle, although not required. Further, the reinforcement may assist in limiting the amount of motion of components (e.g., the frame rail and spare wheel well) toward and away from each other, although also not required.

It should be noted that whatever materials are selected for the carrier member and reinforcement material, they should be able to withstand conditions for the particular location at which they will be installed. For example, the reinforcement member 10 of FIGS. 3-4 can be located relatively close to the muffler of an automotive vehicle and, thus, it can be desirable for the materials for the carrier member and the reinforcement member to have relatively high glass transition temperatures due to potential high temperature exposure caused by the muffler.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A structurally reinforced transportation vehicle, comprising:
   (a) an automotive vehicle having a structure defined by at least two components that at least partially define an underbody of the vehicle wherein the transportation vehicle is a convertible and includes a fore/aft axis; and
   (b) a reinforcement member that includes a carrier member and a reinforcement material disposed upon the carrier member wherein the reinforcement material is adhered to the carrier member and the one or more components and wherein:
      i. the carrier member spans laterally relative to the fore/aft axis of the vehicle and spans laterally between a first side and a second side of the carrier member;
      ii. the at least two components of the vehicle include a first component and a second component;
      iii. the first side of the carrier member includes a first outwardly facing surface and second outwardly facing surface; and
      iv. the reinforcement material is a structural foam that adheres the first outwardly facing surface to the first component and the second outwardly facing surface to the second component for connecting the first component to the second component in a manner that provides the automotive vehicle with greater strength and integrity.

2. A structurally reinforced transportation vehicle as in claim 1 wherein the convertible includes a roof configured for removal or assembly to the vehicle.

3. A structurally reinforced transportation vehicle as in claim 1 wherein the convertible includes a roof that is adjustable from a position overlaying a passenger compartment of the vehicle to a position not overlaying the passenger compartment of the vehicle.

4. A structurally reinforced transportation vehicle as in claim 1 wherein the reinforcement member spans at least partially adjacent the underbody of the automotive vehicle in a lateral direction relative to the vehicle.

5. A structurally reinforced transportation vehicle as in claim 1 wherein the reinforcement material is a thermoset foam material and the carrier member is formed of a thermoplastic material.

6. A structurally reinforced transportation vehicle as in claim 1 wherein the reinforcement member is located within a cavity defined by the at least two components and wherein the at least two components include a frame rail, a trunk compartment or both.

7. A structurally reinforced transportation vehicle as in claim 1 wherein the reinforcement member is composed of a first member for one side of the vehicle and a second member for a second side of the vehicle.

8. A structurally reinforced transportation vehicle as in claim 1 wherein the reinforcement member extends substantially entirely laterally across the vehicle.

9. A structurally reinforced transportation vehicle as in claim 1 wherein the reinforcement member includes one or more mechanical fasteners for at least temporarily holding the reinforcement member in place.

10. A structurally reinforcement transportation vehicle, comprising:
    (a) an automotive vehicle having a structure defined by at least two components that at least partially define an underbody of the vehicle and includes a fore/aft axis; and (b) a reinforcement member that includes a carrier member and a reinforcement material disposed upon the carrier member wherein the reinforcement material is adhered to the carrier member and the at least two components and wherein the reinforcement member spans at least partially adjacent the underbody of the automotive vehicle in a lateral direction relative to the vehicle;

wherein the automotive vehicle is a convertible that includes a roof that is adjustable from a position overlaying a passenger compartment of the vehicle to a position not overlaying the passenger compartment of the vehicle; and wherein the reinforcement material includes a thermoset foam material and the carrier member is formed of a material that at least includes a thermoplastic and has a plurality of ribs and wherein the carrier member includes an outer peripheral strip and the plurality of ribs include internal intersecting ribs; and wherein i. the carrier member spans laterally relative to the fore/aft axis of the vehicle and spans laterally between a first side and a second side of the carrier member;

ii. the at least two components of the vehicle include a first component and a second component;

iii. the first side of the carrier member includes a first outwardly facing surface and second outwardly facing surface; and iv. the reinforcement material is a structural foam that adheres the first outwardly facing surface to the first component and the second outwardly facing surface to the second component for connecting the first component to the second component in a manner that provides the automotive vehicle with greater overall torsional rigidity.

11. A structurally reinforced transportation vehicle as in claim 10 wherein the reinforcement material is adhered to an outwardly facing surface of the peripheral strip.

12. A structurally reinforced transportation vehicle as in claim 10 wherein the reinforcement member is located within a cavity defined by the at least two components and wherein the at least two components include a frame rail and a trunk compartment.

13. A structurally reinforced transportation vehicle as in claim 10 wherein the carrier member includes one or more flanges.

14. A structurally reinforced transportation vehicle as in claim 10 wherein the reinforcement member is composed of a first member for one side of the vehicle and a second member for a second side of the vehicle.

15. A structurally reinforced transportation vehicle as in claim 10 wherein the reinforcement member extends substantially entirely laterally across the vehicle.

16. A structurally reinforced transportation vehicle comprising:

(c) an automotive vehicle having a structure defined by a first component and a second component wherein the first component and the second component at least partially define a cavity of an underbody of the vehicle;

(d) a reinforcement member that includes a carrier member and a reinforcement material disposed upon the carrier member wherein:

the reinforcement material is adhered to the carrier member, a surface of the first component and a surface of the second component for providing the vehicle with greater overall torsional rigidity;

ii. the reinforcement member is located within the cavity of the underbody of the vehicle;

iii. the carrier member is formed of a polymeric material;

iv. the reinforcement material is an adhesive material; and v. the reinforcement member spans laterally relative to a fore-aft axis of the vehicle;

vi. the automotive vehicle is a convertible that includes a roof that is adjustable from a position overlaying a passenger compartment of the vehicle to a position not overlaying the passenger compartment of the vehicle; and vii. the first component is selected from a frame rail or a trunk compartment.

17. A structurally reinforced transportation vehicle as in claim 16 wherein the reinforcement material is a structural foam.

18. A structurally reinforced transportation vehicle as in claim 16 wherein the reinforcement member spans substantially entirely laterally relative to the fore-aft axis of the vehicle.

19. A structurally reinforced transportation vehicle as in claim 16 wherein the carrier member is formed of a material that at least includes a thermoplastic and has a plurality of ribs and wherein the carrier member includes an outer peripheral strip and the plurality of ribs include internal intersecting ribs.

* * * * *

UNITED STATES PATENT AND TRADEMARK OFFICE
CERTIFICATE OF CORRECTION

| | |
|---|---|
| PATENT NO. | : 7,374,219 B2 |
| APPLICATION NO. | : 11/229375 |
| DATED | : May 20, 2008 |
| INVENTOR(S) | : Eric Brennecke |

It is certified that error appears in the above-identified patent and that said Letters Patent is hereby corrected as shown below:

On page 11-
Claim 16-
Line 10 needs to have the letter i inserted in front of the word the.

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,374,219 B2  Page 1 of 1
APPLICATION NO. : 11/229375
DATED : May 20, 2008
INVENTOR(S) : Eric Brennecke It is certified that error appears in the above-identified patent and that said Letters Patent is hereby corrected as shown below:

Column 10
Claim 16-
Line 15 needs to have the letter i inserted in front of the word the.

This certificate supersedes the Certificate of Correction issued July 29, 2008.

Signed and Sealed this

Twenty-sixth Day of August, 2008

JON W. DUDAS
*Director of the United States Patent and Trademark Office*